United States Patent [19]

Blackburn

[11] Patent Number: 5,659,452

[45] Date of Patent: Aug. 19, 1997

[54] METHOD OF DRIVE PROTECTION FOR A SWITCHED RELUCTANCE ELECTRIC MOTOR

[75] Inventor: Scott E. Blackburn, Temperance, Mich.

[73] Assignee: Dana Corporation, Toledo, Ohio

[21] Appl. No.: 634,104

[22] Filed: Apr. 17, 1996

[51] Int. Cl.[6] .................................................. H02H 5/04
[52] U.S. Cl. ........................ 361/31; 318/701; 310/68 C
[58] Field of Search .................................. 318/701, 434, 318/254; 322/94; 310/68 C; 361/30–31, 23–25, 28–29

[56] References Cited

U.S. PATENT DOCUMENTS

| | | | |
|---|---|---|---|
| 4,499,408 | 2/1985 | Bitting et al. | 318/254 |
| 4,896,088 | 1/1990 | Jahns | 318/696 |
| 4,896,089 | 1/1990 | Kliman et al. | 318/701 |
| 4,933,620 | 6/1990 | MacMinn et al. | 318/696 |
| 5,012,171 | 4/1991 | Sember | 318/696 |
| 5,012,172 | 4/1991 | Sember | 318/696 |
| 5,289,107 | 2/1994 | Radun et al. | 322/94 |
| 5,381,081 | 1/1995 | Radun | 322/94 |
| 5,410,235 | 4/1995 | Ehsani | 318/701 |

OTHER PUBLICATIONS

"HV Floating MOS–Gate Drive IC"; International Rectifier, Application Notes; AN–978A; 1990.

*Primary Examiner*—Jeffrey A. Gaffin
*Assistant Examiner*—Michael J. Sherry
*Attorney, Agent, or Firm*—Dykema Gossett PLLC

[57] ABSTRACT

A method of operating a switched reluctance machine is disclosed, which provides electrical current overload protection. The stator winding motor drive employs a high-side semiconductor switch, along with a corresponding high-side gate driver (which incorporates a bootstrap-type drive circuit). A low-side semiconductor switch, and a corresponding gate driver is also used to thereby define a two-switch per phase topology. The high-side MOSFET switch gate driver must have rising, and falling edges from an associated controller in order for the bootstrap drive power supply portion to function. A drive controller is configured so that it will generate these rising, and falling edges only when the motor is moving, as indicated by a speed signal. Therefore, if the motor stops moving, due to an unexpected load, such as a seized pump connected to an output shaft thereof, the speed signal will so indicate the stall, wherein the controller will not generate a signal having rising and falling edges. A bootstrap capacitor in the bootstrap drive circuit will slowly discharge in the absence of pulses from the controller. Once discharged to a predetermined level, the drive circuit will no longer be able to cause the high-side semiconductor switch to conduct, thus breaking the circuit, and interrupting current flow through the stator winding.

6 Claims, 4 Drawing Sheets

METHOD OF DRIVE PROTECTION FOR A SWITCHED RELUCTANCE ELECTRIC MOTOR

BACKGROUND OF THE INVENTION

1. Technical Field

This invention relates generally to a system for controlling a switched reluctance (SR) motor, and more particularly, to a method for providing drive protection for an SR electric motor using a bootstrap gate drive circuit.

2. Discussion of the Related Art

Switched Reluctance Machines (SRMs) have been the subject of increased investigation due to their many advantages, which makes them suitable for use in a wide variety of situations. A SR machine operates on the basis of varying reluctance in its several magnetic circuits. In particular, such machines are generally doubly salient motors—that is, they have teeth or poles on both the stator and the rotor. The stator poles have windings which form machine phases of the motor. In a common configuration, stator windings on diametrically opposite poles are connected in series to form one machine phase.

When a machine phase is energized, the closest rotor pole pair is attracted towards the stator pole pair having the energized stator winding, thus minimizing the reluctance of the magnetic path. By energizing consecutive stator windings (i.e., machine phases) in succession, in a cyclical fashion, it is possible to develop torque, and thus rotation of the rotor in either a clockwise, or counter-clockwise direction. As further background, the inductance of a stator winding associated with the stator pole pair varies as a function of rotor position. Specifically, the inductance varies from a lower level, when a rotor pole is unaligned with a corresponding stator pole, to an upper or maximum level when the rotor pole and stator pole are in alignment. Thus, when a rotor pole rotates and sweeps past a stator pole, the inductance of the stator winding varies through lower-upper-lower inductance levels. This inductance-versus-rotor position characteristic is particularly relevant for controlled operation of the motor. Specifically, current flowing through the stator winding must be switched on (e.g., via power electronics) prior to (i.e., advanced), and maintained during the rising inductance period in order to develop a positive torque. Since positive phase current in the decreasing inductance interval produces a negative or breaking torque, the phase current must be switched off (e.g., by deenergizing the power electronics) before this interval occurs in order to avoid generating negative torque. Accordingly, rotor position sensing is an integral part of a closed-loop switched reluctance motor drive system so as to appropriately control torque generation.

Further, in a switched reluctance motor drive application, the power electronics (i.e., the semiconductor switches for energizing the stator windings) can potentially fail in the event of a prolonged, excessive load on the output of the motor. Therefore, there is a need to provide protection for the power electronics in the event of such an excessive, prolonged load, which is often unexpected (e.g., a pump connected to the output of the motor that seizes and the causes the motor to stall). The art has approached this problem by providing, in a typical configuration, a protection scheme which involves monitoring the current in the machine phases, and disabling the motor drive (i.e., disabling the power electronics) in the event of excessive current therethrough for a prolonged period of time. Although accomplishing, generally, the desired end of overload current protection, these prior art approaches are complicated, costly to implement (i.e., require extra components), as well as being prone to false shutdowns.

Accordingly, there is a need to provide an improved system for controlling a switched reluctance machine that minimizes or eliminates one or more of the problems set forth above.

SUMMARY OF THE INVENTION

The present invention provides an improved motor drive protection method, and has particular application in a motor drive topology incorporating a so-called high-side semiconductor switch to energize one of the plurality of machine phases of the switched reluctance motor. A high-side switch is a switch that is connected to a high voltage rail via a drain terminal of the switch wherein a source terminal of the switch is connected to the stator winding. In one embodiment, a low-side semiconductor switch is also provided to selectively connect the stator winding on an end opposite that connected to the source of the high-side switch to a negative power supply bus (e.g., ground). The inventive method is further applicable when a floating bootstrap-type power supply is used for driving the high-side semiconductor switch.

The method includes four basic steps. The first step involves, as alluded to above, providing a bootstrap drive circuit for selectively causing a high-side semiconductor switch to conduct to thereby energize a corresponding one of the machine phases of the motor. The second step involves determining a rotor speed indicative of an actual speed of the rotor. The third step involves normally commutating the machine phases of the switched reluctance machine using the bootstrap drive circuit when the rotor speed is above a predetermined level. Finally, disabling energization of the machine phases by way of a change in a drive characteristic of the bootstrap drive circuit when the rotor speed is below the predetermined level (which is indicative of an abnormal operating condition) to thereby provide electrical current overload protection for the switched reluctance motor. The invention relies on the principle that the bootstrap motor drive will become depleted or discharged several hundred milliseconds after it senses (i.e., by failure to receive pulses indicative of rotor rotation) that the motor has stopped moving (i.e., due to an unexpected load, such as a pump seizure). One advantage of the present invention is that protection for the power electronics (e.g., semiconductor switches) can be provided without the necessity of extra complicated circuitry. Furthermore, the motor drive can be re-enabled after an overload shutdown; to wit, if the excessive load has been removed from the motor, the rotor of the motor will again begin normal rotation, which will thereby recharge the bootstrap-type motor drive to permit conduction of the high-side switch to thereby reenergize the stator windings.

These and other features and objects of this invention will become apparent to one skilled in the art from the following detailed description, and the accompanying drawings illustrating features of this invention by way of example, but not by way of limitation.

BRIEF DESCRIPTION OF THE DRAWINGS

FIG. 1 is in a "stalled" condition.

DETAILED DESCRIPTION OF THE PREFERRED EMBODIMENTS

Figures 1, 2, 8, 9:
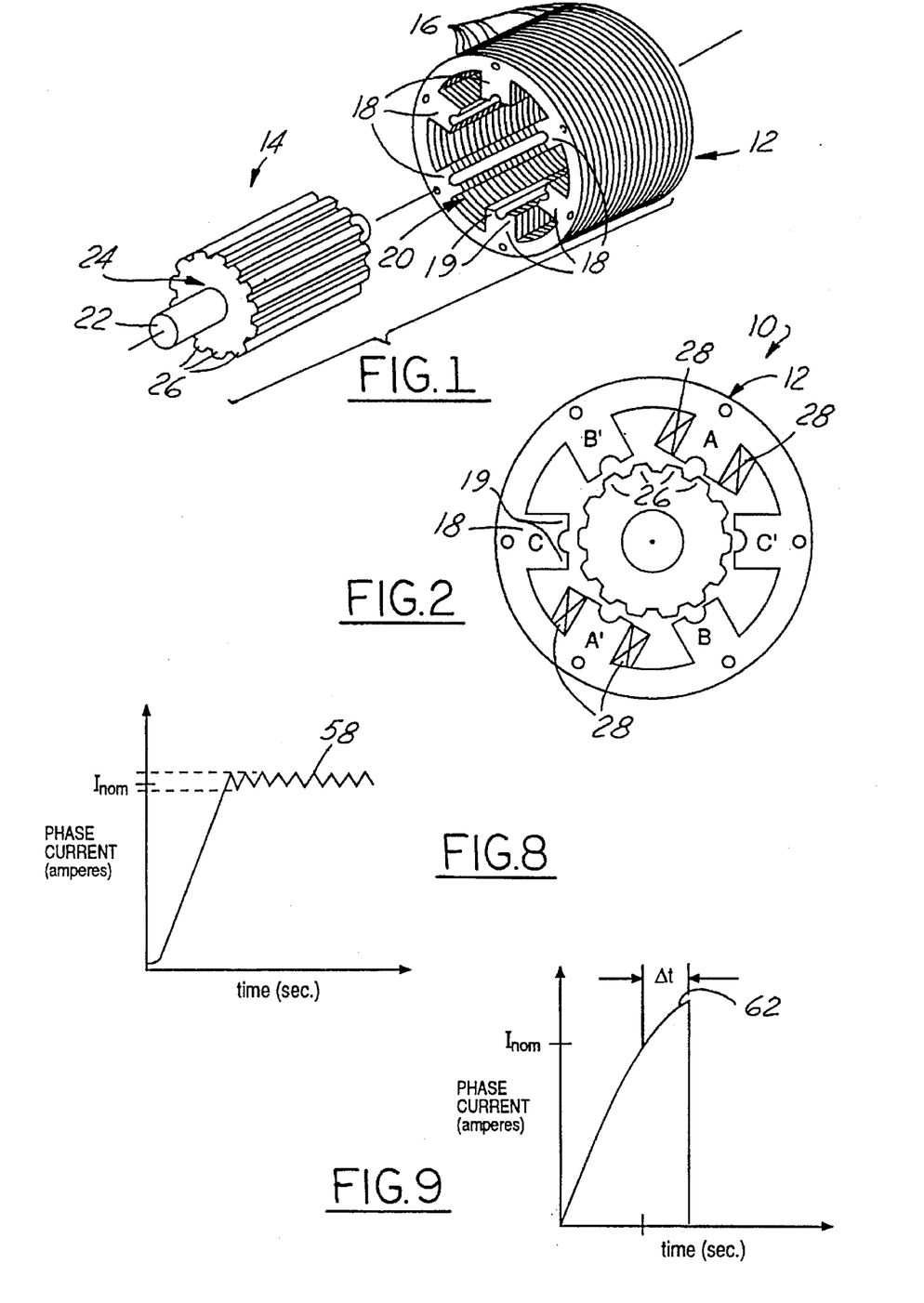
FIG. 1 is an exploded, perspective of a portion of a switched reluctance electric motor suitable for use in connection with the preferred embodiment of the present invention.
FIG. 2 is a diagrammatic, exaggerated, cross-sectional view of a switched reluctance electric motor illustrating the relative positions of a stator, and rotor portions thereof.
FIG. 8 is a phase current-versus-time graph showing an exemplary phase current when the motor shown in FIG. 1 is operating normally.
FIG. 9 is a simplified, phase current-versus-time graph of the phase current through a stator winding when the method according to the present invention is employed to detect a stalled condition to thereby limit the phase current.

Referring now to the drawings wherein like reference numerals are used to identify identical components in the various views, FIG. 1 shows the major mechanical components of a switched reluctance (SR) electric motor 10, which includes a stator assembly 12, and a rotor assembly 14.

Although the invention will be described and illustrated in the context of a switched reluctance electric motor 10, it will be appreciated that this invention may be used in conjunction with other well-known electric motor structures. Stator assembly 12, in a preferred embodiment, comprises a plurality of laminations 16. The laminations are formed using a magnetically permeable material, such as iron.

Stator 12 is generally hollow and cylindrical in shape. A plurality of radially, inwardly extending poles 18 are formed on stator 12 (via laminations 16) and extend throughout the length thereof. Poles 18 are preferably provided in diametrically opposed pairs. In the illustrative embodiment, each of the six poles 18 includes a respective pair of teeth 19 for a total of 12 teeth. It should be appreciated, however, that a greater or lesser number of poles 18 may be provided in particular configuration.

Each of the poles 18 may have a generally rectangular shape, when taken in cross-section. The radially innermost surfaces of the poles 18 are slightly curved so as to define an inner diameter representing bore 20. Bore 20 is adapted in size to receive rotor assembly 14.

Rotor assembly 14, when assembled into stator 12 (best shown in FIG. 2) is coaxially supported within stator 12 for relative rotational movement by conventional means. For purposes of description only, and not limitation, rotor assembly 14 may be supported by conventional bearings (not illustrated) mounted in conventional end bells (not shown) secured to the longitudinal ends of the stator assembly 12. Rotor assembly 14 includes a generally cylindrical shaft 22, and rotor 24. Shaft 22 may be hollow, although illustrated in FIG. 1 as being solid. Rotor 24 is secured to shaft 22 for rotation therewith. For example, rotor 24 may be secured to shaft 22 by means of a spline (not shown), or other conventional means well-known in the art. Thus, it should be appreciated that shaft 22, and rotor 24 rotate together as a unit.

Rotor 24 includes the plurality of poles 26 formed on an outer surface thereof. Each pole 26 extends radially outwardly from the outer surface thereof and is formed having a generally rectangular shape, when taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by poles 26 is slightly smaller than the inner diameter defined the radially innermost curved surfaces of stator poles 18. Rotor poles 26 may also be provided in diametrically opposed pairs. Fourteen (14) rotor poles 26 are provided on the illustrated rotor assembly 14; however, it should be appreciated that a greater or lesser number of rotor poles 26 may be provided. For SR motors, in general, the number of rotor poles 26 differs from the number of stator poles 18, as is well-known. Rotor 24, including poles 26, may be formed from a magnetically permeable material, such as iron.

Referring now to FIG. 2, a diagrammatic view of cross-section of an assembled motor 10 is illustrated. In particular, as referred to above, poles 18 occur in pairs: i.e., A A', B B', and C C'. The rotor poles 26 also appear in pairs. Stator windings 28 (shown only on stator pole pair AA' for clarity) of diametrically opposite poles (e.g., A A') associated with stator 12 are connected in series to form one machine phase. Thus, the windings 28 on poles A A' are referred to as "machine phase A" of SR motor 10.

In the illustrated example, SR motor 10 also has a machine phase B, and a machine phase C. Each of these three machine phases may be energized individually, which, when done in a controlled manner, provides for rotation of rotor 24. Although a three-phase machine is described and illustrated, a machine having any number of phases is contemplated as falling within the spirit and scope of the present invention.

Figure 3:
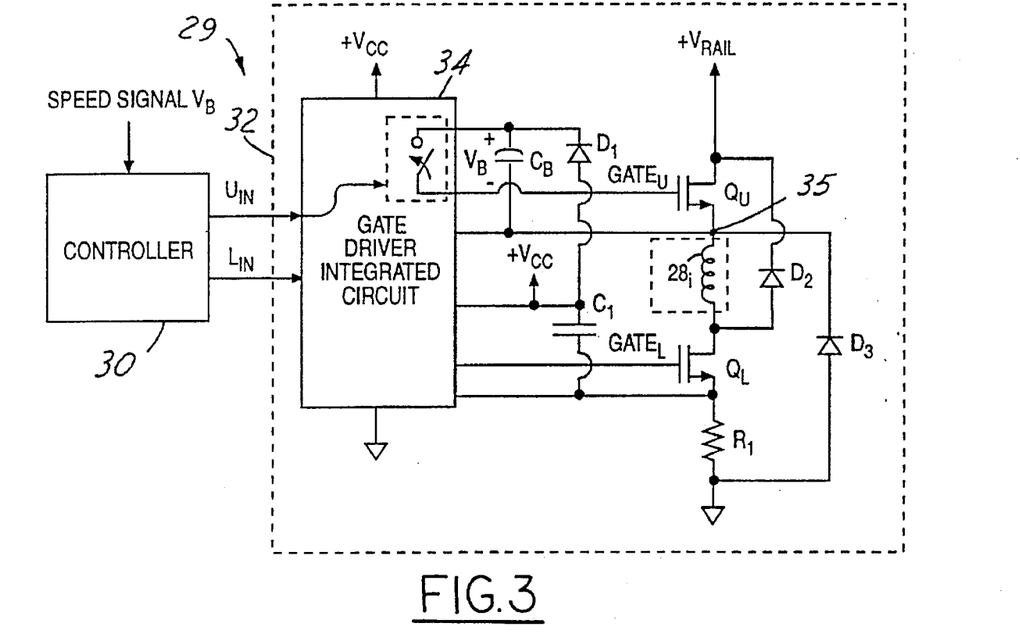
FIG. 3 is a simplified, block and schematic diagram view showing a preferred bootstrap-type motor drive used in implementing the method according to the present invention.

Referring now to FIG. 3, a preferred environment in which the method according to the present invention may be employed is illustrated. In particular, the circuit shown in FIG. 3 employs a power semiconductor switch arranged in what is known in the art as a high-side configuration. Although those of ordinary skill in the art will appreciate the many reasons why such a configuration might be employed (which will not be detailed herein), several design constraints apply to such a high-side configuration. First, it should be appreciated that the gate voltage applied to the high-side semiconductor switch $Q_u$ must be typically 10–15 volts higher than the drain voltage. A problem arises in this respect since, being a high-side configuration, the gate voltage would have to be higher than the positive power supply bus voltage ($V_{cc}$), which is frequently the highest voltage available in a system. Thus, there must be some mechanism available to provide the necessary gate drive. In the illustrated embodiment, a bootstrap-type power supply is employed which provides the means for practicing the method according to the present invention.

FIG. 3 thus shows a circuit 29 used to provide the needed gate drive and thus to practice the method according to the present invention. Circuit 29 includes controller 30, and bootstrap drive circuit 32.

Controller 30 is responsive to a rotor speed signal $V_B$ whose magnitude is inversely proportional, in one embodiment, to an actual speed of rotor 24. Based on speed signal $V_B$, and in accordance with a predefined operating strategy, which may include, but is not limited to, energizing certain machine phases based on the rotor position of rotor 24, as is known in the art, controller 30 is used to generate a high-side switch drive command energizing signal $U_{in}$, and a low-side switch drive command energizing signal $L_{in}$.

Bootstrap drive circuit 32 is employed to provide the boosted gate drive signal and includes a gate driver integrated circuit 34, a bootstrap capacitor $C_B$, a first diode $D_1$, a first capacitor $C_1$, a high-side semiconductor switch $Q_U$, a low-side semiconductor switch $Q_L$, a first resistor $R_1$, a second diode $D_2$, a third diode $D_3$ and a node 35.

Gate driver integrated circuit 34 is provided for performing most of the functions, to be described in further detail hereinafter, required to drive one high-side semiconductor switch $Q_U$, and one low-side power semiconductor switch $Q_L$. These functions include providing necessary input logic responsive to signals $U_{in}$, and $L_{in}$, for driving level translators to cause the high-side switch $Q_U$, and the low-side (i.e., ground-referenced) switch $Q_L$. Another function may include providing the needed, internal switching which permits the bootstrap motor drive to generate the boosted gate drive signal (more detailed description of which is found below). In a constructed embodiment, gate driver 34 takes the form of a commercially available component, part number IR2110 from International Rectifier, El Segundo, Calif. It should be appreciated that there are widely available substitute integrated circuits and/or discrete component arrangements that perform substantially similar functions. A complete description of the particular gate driver integrated circuit 34 used in the constructed embodiment may be found in application note AN-978A, entitled "HV Floating MOS-Gate Driver IC", available from International Rectifier, and hereby incorporated by reference.

Gate driver integrated circuit 34 is responsive to signal $U_{in}$ in order to generate gate drive signal $GATE_U$, which is applied to the gate terminal of high-side $Q_U$. Likewise, gate driver 34 is responsive to the signal $L_{in}$ to generate the gate drive signal $GATE_L$ which is applied to the gate terminal of switch $Q_L$. To effectively bias high-side switch $Q_U$ into conduction, and to therefore effectively transfer the upper rail voltage $V_{rail}$ to the stator winding $28_i$, the gate terminal must be at a higher voltage than $V_{rail}$, as is well-known to those of ordinary skill in the art. To accomplish this objective, a bootstrap capacitor $C_B$ is provided.

Switches $Q_U$ and $Q_L$ may be power MOSFET devices (NMOS). These devices are conventional and selection of the particular devices is well within the skill of a practitioner in the art. Components $C_B$, $D_1$, $C_1$, $R_1$, and $D_2$ are conventional and well-known in the art. Selection of the particular values will vary with particular design considerations.

During a non-energized interval of stator winding $28_i$, which corresponds to a logic low on input signal $U_{in}$ to gate driver 34, bootstrap capacitor $C_B$ is charged to approximately $V_{cc}$ by way of diode $D_1$; certain pins on gate driver 34 assume high impedance output states that permit this charging to occur.

When it is desired to energize stator winding $28_i$, low-side input signal $L_{in}$ is asserted, which is effective to generate the signal $GATE_L$, which in turn causes transistor $Q_L$ to be placed in the conductive state. Input signal $U_{in}$ is also asserted. When this occurs, gate driver 34 via internal switching, is operable to transfer the voltage then-existing across bootstrap capacitor $C_B$; namely $V_B$ which is approximately equivalent to $V_{cc}$, onto the gate drive signal $GATE_U$. This causes high-side switch $Q_U$ to begin to conduct, thus transferring the voltage potential appearing on the upper voltage rail $V_{rail}$ to node 35. As node 35 begins to float upwards from ground (i.e., by virtue of switch $Q_L$ being turned-on) towards the upper rail $V_{rail}$, the voltage applied by gate driver 34 upon the gate terminal of $Q_U$ via the $GATE_U$ signal also rises therewith. It should be appreciated that the voltage applied to the gate terminal of switch $Q_U$ is always a voltage potential $V_B$ higher than the voltage appearing at node 35. Once high-side switch $Q_U$ is fully turned-on, potential $V_{rail}$ is transferred to node 35, and a voltage potential approximately equivalent to: $V_{rail}+V_B$ is applied to the gate terminal of $Q_U$.

However, it should be understood that a significant feature of high-side semiconductor switch $Q_U$ is its capacitive input characteristic; i.e., the fact that it is turned-on by supplying a charge to the gate rather than a continuous current. Thus, as time goes by, the charge existing on capacitor $C_B$ is slowly dissipated, wherein eventually the voltage potential of gate drive signal $GATE_U$ dwindles, thus decreasing the conductivity of switch $Q_U$, to a point where $Q_U$ eventually becomes non-conductive.

It should be understood that the capacitance value of bootstrap capacitor $C_B$ must be selected so as to balance several factors, including, but not limited to, the amount of gate charge required, the longest possible conduction time of switch $Q_U$ (i.e., the longer the time, the larger the capacitance), and the shortest conduction time. Thus, although the size of $C_B$ may vary, the basic principle involved is that the signal $U_{in}$ must periodically turn-on, and turn-off (i.e., pulse so that rising and falling edges are observed). This activity is necessary so that intervals are provided that permit bootstrap capacitor $C_B$ to be charged to $V_{cc}$ by way of diode $D_1$. If no such activity appears to gate driver 34, bootstrap capacitor $C_B$ will discharge (as described above), thus turning off high-side gate $Q_u$.

Figure 4A:
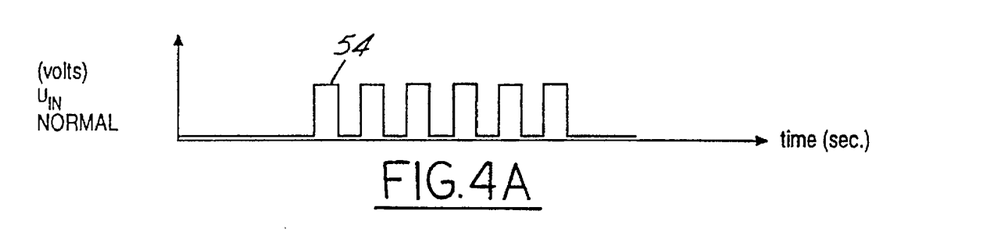
FIG. 4A is a simplified, high-side input voltage-versus-time graph generated by the controller of FIG. 3 during normal operation of the motor that is illustrated in FIG. 1.
Figure 4B:
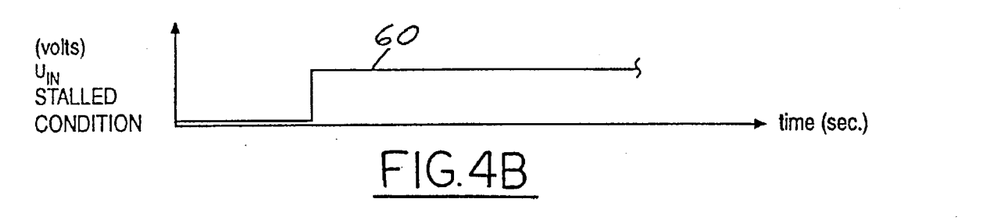
FIG. 4B is a simplified, high-side input voltage-versus-time graph generated by the controller of FIG. 3 when the motor shown
Figure 4C:
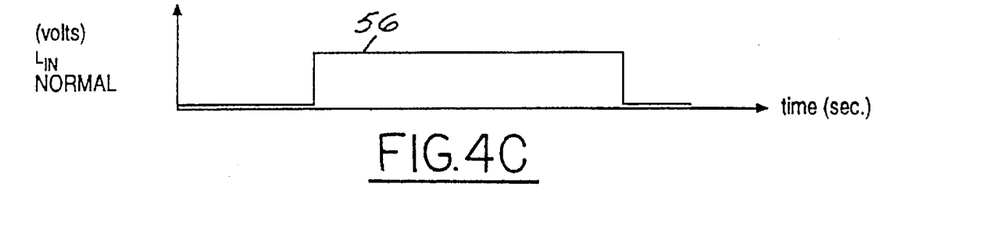
FIG. 4C is a low-side input voltage-versus-time graph generated by the controller of FIG. 3 when the motor illustrated in FIG. 1 is operating in a normal mode.

FIG. 4A, and FIG. 4C show signals $U_{in}$ and $L_{in}$ for normal operation of electric motor 10. Controller 30 is operative to generate $U_{in}$, as indicated at trace 54, when rotor 24 is rotating within a normal speed range indicative of a normal operation thereof. Note that, in FIG. 4C, ground-referenced switch $Q_L$ is desired to be continuously on, and controller 30 is so operative to generate trace 56 to accomplish this end.

FIG. 4B shows signal $U_{in}$ when speed signal V indicates that electric motor 10 is in a stalled or near-stalled condition, indicative of an unexpected, excessive load. Note that trace 60 includes no rising, or falling edges. Accordingly, based on the foregoing discussion, bootstrap capacitor $C_B$ will discharge, which in turn will operate to cause high-side switch $Q_U$ to turn-off.

Figures 5, 6, 7:
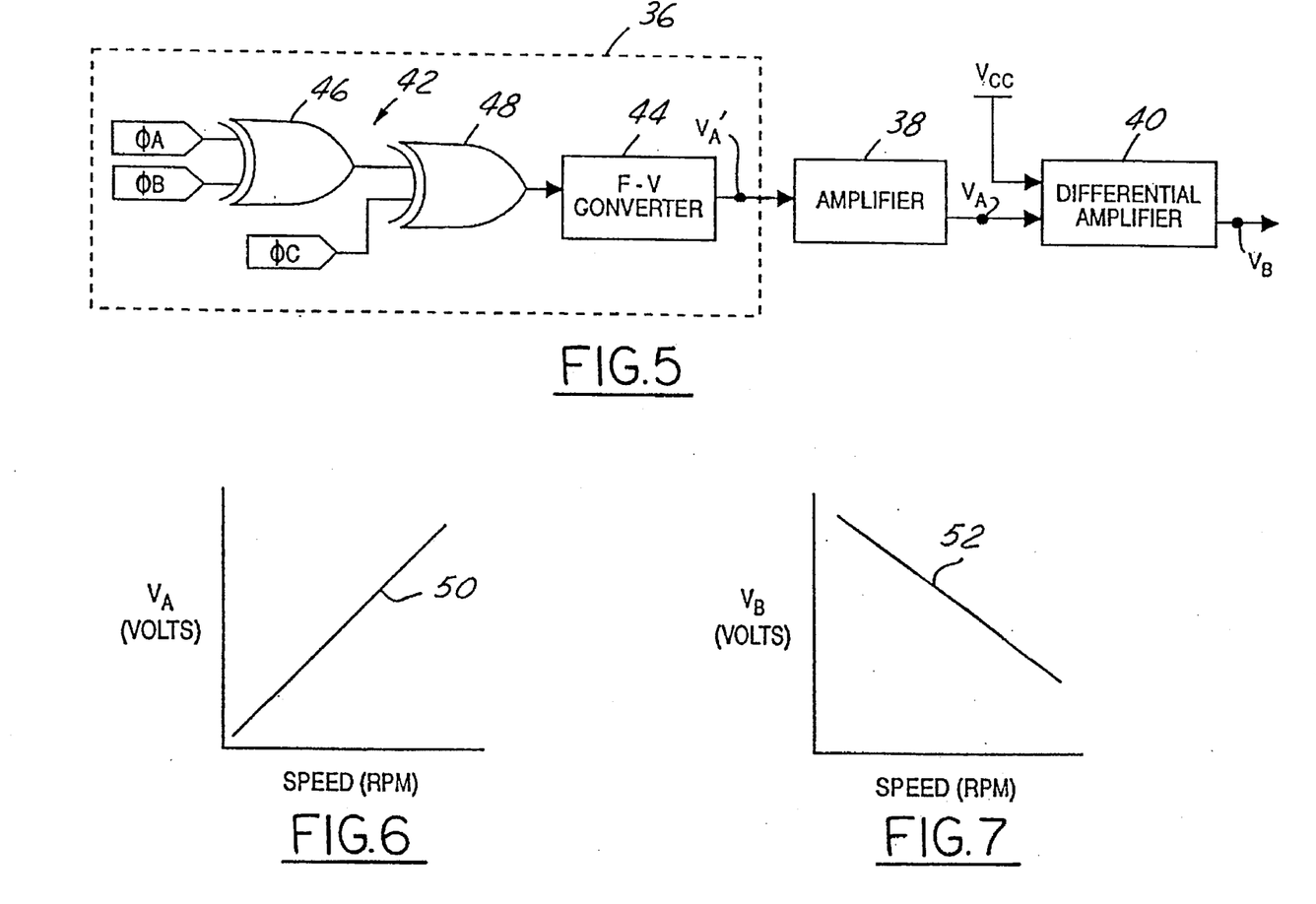
FIG. 5 is a simplified schematic and block diagram view showing a rotor speed sensing circuit for use in implementing the method according to the present invention.
FIG. 6 is a simplified, rotor speed-versus-voltage graph of the speed signal $V_A$ generated by the speed signal generating circuit shown in FIG. 5.
FIG. 7 is a simplified, rotor speed-versus-voltage graph of the speed signal $V_B$ generated by the speed signal generating circuit shown in FIG. 5.

Referring now to FIG. 5, circuitry is illustrated that is operable to generate speed signal $V_B$, and which includes means, such as speed sensing circuit 36, for sensing a speed of the rotor in generating a preliminary speed signal $V'_A$ in response thereto, an amplifier 38, and a differential amplifier 40.

Speed sensing circuit 36 is responsive to a plurality of machine phase commutation signals $\Phi_n$ for generating the preliminary speed signal $V'_A$. The machine phase commutation signals $\Phi_n$ comprise a plurality of individual signals, one for each machine phase of SR motor 10, wherein each one of the plurality of signals is indicative of whether the respective machine phase is commanded to be energized. Collectively, the machine phase commutation signals may be processed to provide an indication of the magnitude of the speed of rotor 24. Circuit 36 includes logic means 42, responsive to the machine phase commutation signals, for generating an output signal having a frequency which is indicative of the rotor speed, and a frequency-to-voltage converter 44 responsive to the logic means output signal for generating signal $V'_A$, wherein the preliminary speed signal $V'_A$ has a voltage magnitude corresponding to the rotor speed.

Logic means 42 includes a first exclusive-OR (XOR) gate and a second exclusive-OR (XOR) gate 48 connected in series to generate an output pulse train whose frequency of transition corresponds to the rotor speed. It should be appreciated that other circuit arrangements performing the same logical functions as described above fall within the spirit and scope of the present invention.

Frequency-to-voltage converter 44 is conventional in the art, and performs its well-known function.

Amplifier 38 provides a voltage level, and impedance interface function to translate preliminary speed signal $V'_A$ to a signal having a power level sufficient to drive subsequent stages; namely, differential amplifier 40.

FIG. 6 shows the output of amplifier 38; namely, first speed signal $V_A$. As indicated in FIG. 6, signal $V_A$, represented by trace 50, has a voltage magnitude that is proportional to the speed of rotor 24.

Differential amplifier 40 is well-known and conventional in the art, and may comprise, for example, an operational amplifier appropriately configured.

FIG. 7 shows the second speed signal $V_B$ that is generated by differential amplifier 40, indicated at trace 52. It should be appreciated from FIG. 7 that the speed signal $V_B$ now has a voltage magnitude that is inversely proportional to the speed of rotor 24. Controller 30 may, for example, have a comparator circuit that detects when the speed signal $V_B$ has a magnitude higher than a predetermined level to indicate that the rotor speed has fallen below a corresponding predetermined level, indicative of an excessive load (i.e., slow or stalled operation).

Figure 10:
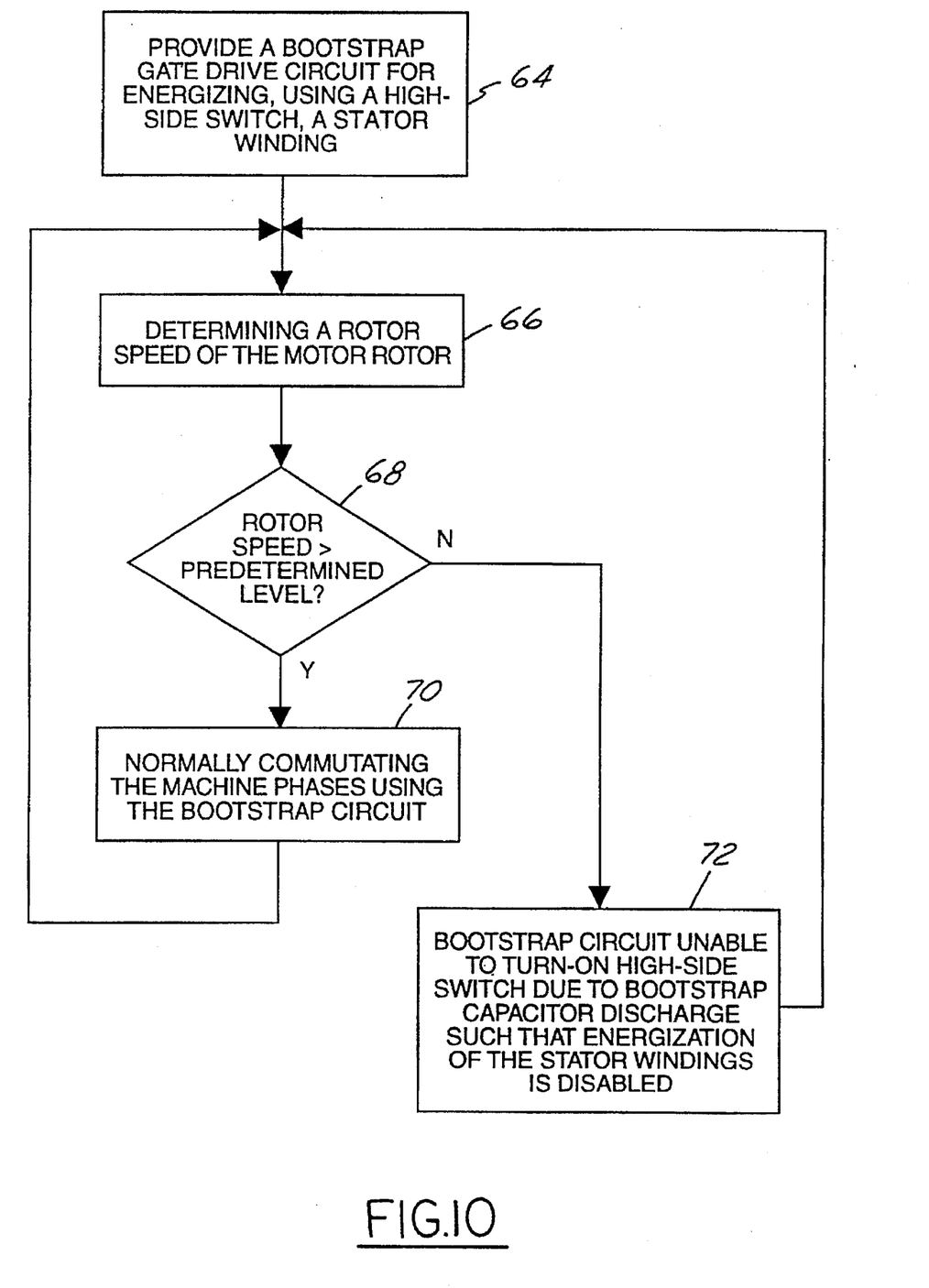
FIG. 10 is a flow-chart diagram of the inventive technique for drive protection.

Referring now to FIGS. 8, 9, and 10, the operation of the inventive method for providing overload protection for a switched reluctance motor 10 will be set forth. Referring particularly to FIG. 8, phase current through a selected machine phase of motor 10 is illustrated as trace 58, including a "chopping" interval as is well-known in the art, in order to obtain a nominal current $I_{nom}$ through the stator winding $28_i$.

Referring particularly to FIG. 10, a switched reluctance motor control, particularly the motor drive portion, is provided with a bootstrap gate drive circuit for causing a high-side semiconductor switch to conduct to thereby energize the corresponding one of the plurality of machine phases. This basic step is shown in the block indicated at 64.

Step 66 involves determining a rotor speed of the motor rotor wherein the rotor speed is indicative of an actual, rotational speed of rotor 24. This step may include the substep of logically processing commutation signals $\Phi_n$, which, as indicated above, are indicative of when the plurality of machine phases are to be energized, in order to define the rotor speed signal. In one configuration, a preliminary rotor speed signal is characterized by a frequency which corresponds to the actual rotor speed. Another rotor speed signal is characterized by a voltage magnitude that corresponds to the actual rotor speed.

Step 68 involves determining whether the rotor speed is greater than a predetermined level. If the rotor speed is higher than such predetermined level, then step 70 is performed, which involves normally commutating the machine phases using the bootstrap circuit. Alternatively, if the rotor speed is less than a predetermined level (and, which may be zero in the case of stalled condition), then step 72 is performed which involves disabling energization of machine phases by way of a change in a drive characteristic (i.e., discharge of the bootstrap capacitor), which allows the gate drive signal $GATE_U$ to decrease) of the bootstrap drive circuit when the rotor speed is below the predetermined level to thereby provide electrical current overload protection for the SRM 10.

It should be appreciated that the determination of whether the rotor speed is above or below a predetermined level is accomplished, in the preferred embodiment, by the discharge time of the bootstrap capacitor $C_B$. That is, such determination involves the substeps of charging a bootstrap capacitor $C_B$ during a time interval when the machine phase is de-energized to establish a preselected voltage potential thereon, and, permitting discharge of the bootstrap capacitor during the time interval when the corresponding machine phase is to be energized. The change in the drive characteristic of the bootstrap drive circuit involves a change in the amount of charge available on the bootstrap capacitor, which, by the well-known charge-voltage-capacitance relationship, will cause a change in the voltage potential on the bootstrap capacitor. As described above, as the voltage on the bootstrap capacitor decreases, the high-side semiconductor switch $Q_U$ turns off, thus performing the step of disabling energization of that stator winding. This turn-off provides the electrical current overload protection for the motor 10.

In sum, this invention provides overload protection for a switched reluctance motor 10. Such protection is accomplished, and is preferably employed in a motor drive employing a high-side semiconductor switch $Q_U$, whose corresponding driver topology is of the floating bootstrap-type. Since the high-side gate driver must have rising and falling edges from the controller in order for the bootstrap driver circuit to function, it will only turn-on and off only if the motor 10 is moving, as indicated by a speed signal. Thus, if motor 10 stops moving due to an unexpected load, the high-side semiconductor switch $Q_U$ will turn-off as soon as the bootstrap power supply (i.e., bootstrap capacitor $C_B$) used in the high-side gate driver circuit is depleted or discharged, which typically may be on the order of several hundred milliseconds. Since both the high-side, and low-side (i.e., ground-reference) semiconductor switches must be on for current to flow through stator winding $28_i$, the drive will be disabled when $Q_U$ shuts down. Therefore, an overcurrent condition due to an overload on motor 10 will be limited to several hundred miliseconds. This time interval provides more than adequate protection for the power electronics in the event of an overload. Furthermore, the motor drive can be re-enabled after an overload shutdown; if the excessive load has been removed, the motor 10 will return to normal operation (i.e., rotation within a normal speed range), if not, the drive will again shutdown as described above. Moreover, no extra circuitry, or complicated current sensing component are needed, thus reducing cost and improving reliability thereby.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

I claim:

1. A method of operating a switched reluctance machine (SRM) wherein the machine includes a rotatable rotor, a stator, and a plurality of stator windings defining a corresponding plurality of machine phases, comprising the steps of:

(A) providing a bootstrap drive circuit for selectively causing a high-side semiconductor switch to conduct to thereby energize a corresponding one of the plurality of machine phases;

(B) determining a rotor speed indicative of an actual speed of the rotor;

(C) normally commutating the machine phases of the SRM using the bootstrap drive circuit when the rotor speed is above a predetermined level; and, (D) disabling energization of the machine phases by way of a change in a drive characteristic of the bootstrap drive circuit when the rotor speed is below the predetermined level which is indicative of an abnormal operating condition to thereby provide electrical current overload protection for the SRM.

2. The method of claim 1 wherein step (A) includes the substep of:

charging a bootstrap capacitor during a time when the corresponding machine phase is unenergized to thereby establish a preselected voltage potential thereon.

3. The method of claim 1 wherein step (B) includes the substep of:

logically processing commutation signals indicative of when the plurality of machine phase are energized to define a rotor speed indicative signal having a fequency corresponding to the actual rotor speed.

4. The method of claim 1 wherein step (C) includes the substep of:

generating a drive command signal using commutation signals;

applying the drive command signal to the bootstrap circuit to thereby cause the high-side semiconductor switch to energize the corresponding machine phase.

5. The method of claim 1 wherein said drive characteristic of the bootstrap circuit includes an amount of charge available from a bootstrap capacitor.

6. A method of operating a switched reluctance machine (SRM) wherein the machine includes a rotatable rotor, a stator, and a plurality of stator windings defining a corresponding plurality of machine phases, comprising the steps of:

(A) providing a bootstrap drive circuit, including a bootstrap capacitor for selectively causing a high-side semiconductor switch to conduct to thereby energize a corresponding one of the plurality of machine phases;

(B) charging the bootstrap capacitor during a time when the corresponding machine phase is unenergized to thereby establish a preselected voltage potential thereon;

(C) determining a rotor speed indicative of an actual speed of the rotor;

(D) normally commutating the machine phases of the SRM using the bootstrap drive circuit when the rotor speed is above a predetermined level; and, (E) disabling energization of the machine phases by discharging the bootstrap capacitor during energization of the corresponding machine phases such that the high-side semiconductor switch is unable to conduct when the rotor speed is below the predetermined level which is indicative of an abnormal operating condition to thereby provide electrical current overload protection for the SRM.

* * * * *

UNITED STATES PATENT AND TRADEMARK OFFICE
CERTIFICATE OF CORRECTION

PATENT NO. : 5,659,452
DATED : August 19, 1997
INVENTOR(S) : Blackburn

It is certified that error appears in the above-indentified patent and that said Letters Patent is hereby corrected as shown below:

Column 9, line 36  "fequency" to --frequency--.

Signed and Sealed this

Twenty-first Day of October 1997

Attest:

BRUCE LEHMAN

Attesting Officer

Commissioner of Patents and Trademarks